Oct. 10, 1961 T. HINDMARCH 3,003,606
REVERSING TRANSMISSION ASSEMBLAGES
Filed March 9, 1959 3 Sheets-Sheet 1

Inventor
T. Hindmarch
By Glascock Downing Seebold
Attys

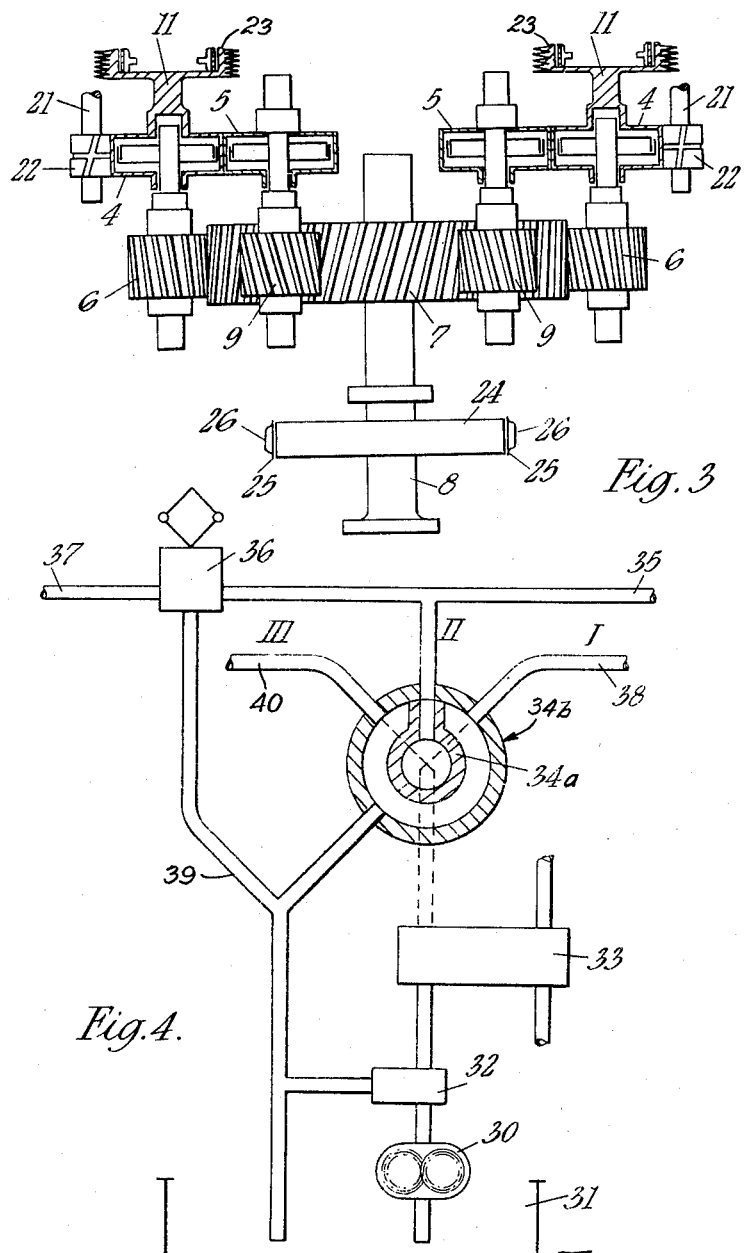

Oct. 10, 1961     T. HINDMARCH     3,003,606
REVERSING TRANSMISSION ASSEMBLAGES

Filed March 9, 1959     3 Sheets-Sheet 3

Inventor
T. Hindmarch
By Glascott Downing Seebold
Attys.

United States Patent Office

3,003,606
Patented Oct. 10, 1961

3,003,606
REVERSING TRANSMISSION ASSEMBLAGES
Thomas Hindmarch, Lindo Lodge, Stanley Ave.,
Chesham, Buckinghamshire, England
Filed Mar. 9, 1959, Ser. No. 798,021
Claims priority, application Great Britain Mar. 14, 1958
6 Claims. (Cl. 192—4)

The present invention relates to reversing transmission assemblages.

More particularly, the invention is concerned with reversing transmission assemblages adapted for use in the propulsion systems of ships, although the inventive concept is not thus limited and can be used in other drives, such as rolling mills and other heavy machinery wherein high values of kinetic energy are involved.

It is well known that a speedy reversal is an absolute necessity for the maneuverability of marine vessels and not only is it necessary for the propulsion machinery to be such as to drive in the opposite direction, but, the weight may have to be removed so that the vessel can perform a desired maneuver.

Numerous embodiments are known in vessel machines in which a prime mover, such as a diesel engine drives a propeller through a reversing gear assembly. Frequently, one friction clutch is used for ahead running and another friction clutch for astern running. When it is desired to move the vessel astern, from for instance full speed ahead, the fuel supply to the engine is arrested and the ahead clutch disengaged. This type of engine slows down rapidly to the idling speed, which speed generally is about one-third of the full speed, whereas the propeller also slows down to approximately half-speed. The astern clutch is then engaged and from the instant of engagement, until the propeller reaches a speed in the reverse direction which corresponds to the engine speed at the time, there is a slip in the astern clutch. The amount of energy to be dissipated in the form of heat in the clutch depends, inter alia, on the kinetic energy of the various rotating components. Since the kinetic energy varies as the square of the speed, this inherent drop in the speed of an internal combustion engine makes it possible to provide reversing transmissions which are capable of carrying large powers without expensive and complex arrangements being made for the cooling of either of the clutches.

However, when the prime mover is a turbine, a very different set of conditions arises. For example, when the pressure is cut-off and the ahead clutch disengaged, the propeller slows down as previously described, but, the drop in speed of the turbine is very much slower.

The kinetic energy of the turbine at full speed is generally much higher than that of a corresponding diesel engine, and, in typical situations, three to five times that of the propeller and its associated gearing and shafting at corresponding speeds.

The ratio of the momentums of the turbine and the propeller, however, is quite different and in typical cases, the momentum of the turbine is one-fifth to one-third of the momentum of the propeller. With no input power and ignoring frictional losses, it is the ratio of momentums which determines the final speed of both turbine and propeller after the astern clutch is engaged. If the astern clutch is engaged when the turbine is running at full speed, and the propeller at half-speed, the final speeds in a typical situation would be, with the propeller still turning ahead at approximately one-quarter of full speed and the turbine running in the reverse direction also at approximately one-quarter speed.

Inasmuch as the turbine must be brought to rest prior to acceleration in the reverse direction, it is manifest that at least the full kinetic energy of the turbine must be dissipated in the form of heat in the clutch.

In installations of this general type, it is usually necessary to use hydro-dynamic clutches in which the operating fluid is circulated at a high rate through coolers. Such clutches are slow in operation and are less efficient than friction clutches during normal running and the required installation is bulky and expensive.

Another disavantage is that the reverse operation of the turbine generally necessitates additional complications in its structural details, which lowers its efficiency in normal operation. The application of power to the turbine to prevent the reverse running thereof adds to the amount of energy to be dissipated in the clutch.

The salient object of the present invention is to overcome the above and other problems currently existing in the art.

A further object of the invention is to provide means enabling friction clutches to be employed without the necessity of including complex and expensive cooling arrangements.

To accomplish the above and other advantageous objects, which will hereinafter become more fully apparent, the invention broadly comprises a power transmission system including at least one prime mover, at least one power output shaft, change-direction reduction gearing between the prime mover and the output shaft, at least one brake operatively associated between the prime mover and the frame of the transmission to brake the prime mover, and at least one brake operatively associated between the output shaft and the transmission frame to brake the output shaft, with the brakes being operable when the drive between the prime mover and the output shaft is discontinued for the purpose of changing direction.

The brakes must be capable of dissipating the energy involved, but, it is usually much simpler to supply adequately cooled brakes than clutches capable of dissipating the same amount of heat.

In operation, when the drive between the input and the output shafts is discontinued by the disengagement of the clutches, the brakes are applied to both the input and the output shafts whereupon both shafts are reduced in speed, but not necessarily brought to rest. The reduction in speed is arranged so that on engagement of a clutch, the remaining kinetic energy is within the heat dissipating capacity of the clutch. Generally, it is most economical to bring the output shaft to rest and to reduce the speed of the input shaft to approximately one-third of full speed.

With certain prime movers, such as steam turbines, it is desirable to maintain the same operating at a slow speed with a very small fraction of power supplied to keep the temperature as nearly constant as possible. In such cases, the input brakes are controlled through a speed responsive means arranged so that when the input speed has been reduced to the desired degree, the brake is released and is reapplied if the speed rises above the desired degree during the period when all clutches are disengaged.

While the invention is not restricted to any specific form or type of slippable clutches and brakes, it is preferred to employ fluid pressure operated friction clutches provided with cooperating annular V-grooved facing surfaces, and hydraulically operated brakes. Generally, both the clutches and the brakes are operated from a common pressure supply source.

There is provided a three position control which effects the following sequence of operation:

(1) The ahead clutch engaged, the astern clutch disengaged and the brakes disengaged.

(2) The clutches disengaged and the brakes applied, and (3) The astern clutch engaged, the ahead clutch disengaged and the brakes disengaged.

Further features and advantages of the invention will be apparent from the following description and the accompanying drawings illustrating by way of example only, a number of embodiments of the invention, in which:

FIG. 3 is a plan view of yet another embodiment of the invention;

Figure 5:
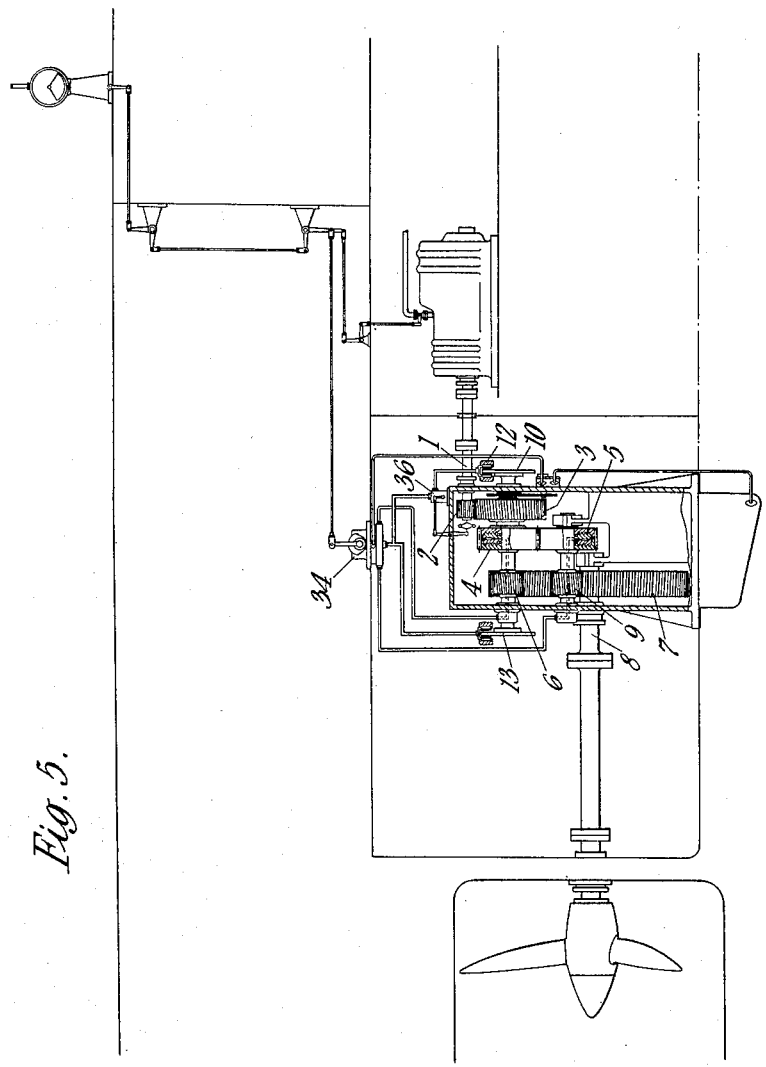

FIG. 4 diagrammatically illustrates a control arrangement for the invention; and, FIG. 5 is a diagrammatic view showing the installation of the invention in a marine vessel.

Figure 1:
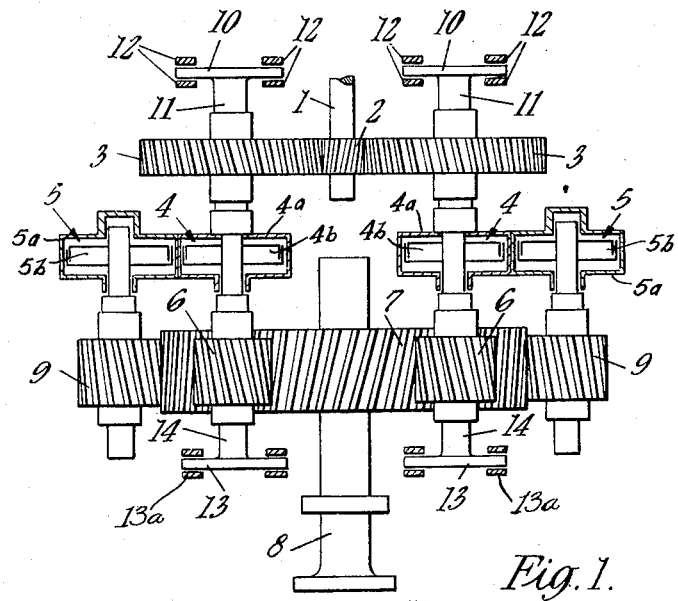
FIG. 1 is a plan view, partly in cross section of one form of the invention.

In FIG. 1, there is illustrated a transmission assemblage with one input shaft and one output shaft. More specifically, input shaft 1 carries a pinion 2 which pinion meshes with gears 3, there being one gear 3 on either side of the pinion. Each gear 3 is operatively connected to outer components 4a of ahead clutches 4, and outer components 4a are provided on their peripheries with gear teeth which mesh with complemental gear teeth on the peripheries of outer components 5a of astern clutches 5.

Inner components 4b of the clutches 4 are operatively coupled to drive pinions 6 which are in meshing relationship with gear 7 on output shaft 8. Also, it will be seen that inner components 5b of the clutches 5 are coupled to drive pinions 9 which latter pinions are in mesh with the gear 7.

The gears 3 are mounted on intermediate shafts 11, and, disc brake means 10 are secured to each intermediate shaft 11. Friction pads 12 are associated with each disc brake means 10 and are adapted to be applied to the disc brake means by hydraulic pressure for braking purposes. The brake disc means 10 are therefore permanently connected by the gearing 2, 3 to the input shaft 1 and as a consequence to the prime mover.

Similarly, shafts 14 on which the drive pinions 6 are mounted carry disc brake means 13 and friction pads 13a associated therewith are applied to the brake means 13 for braking purposes, preferably by hydraulic pressure. The brake means 13 are therefore permanently connected to the output shaft 8 by gearing.

Disc brakes have a high inherent rate of heat dissipation, but, in situations where the same is inadequate, there is provided additional cooling by, for example, an air blast, a liquid bath or liquid circulation through the disc brake.

Figure 2:
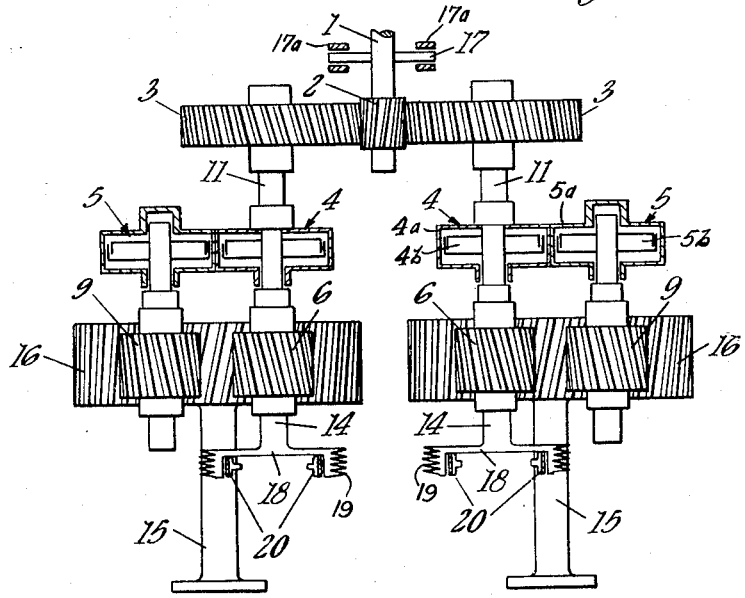
FIG. 2 is a view similar to FIG. 1 of a further form of the invention.

In FIG. 2, there is shown a transmission having a single input shaft and two output shafts. The input pinion, intermediate gears, clutches and pinions associated with the ahead and astern clutches are similar to and bear the same reference characters as in FIG. 1.

In lieu of the single output shaft, there are provided two output shafts 15 on which are mounted gears 16, the pinions 6 and 9 meshing with such gears. Disc brake means 17 and friction pads 17a associated with the input shaft 1 are similar to the components 10–12 shown in FIG. 1 and function in the same fashion.

The brake means associated with each of the output shafts 14 include drum brake means 18 formed with heat radiating fins 19 and actuated by internal expanding shoes 20.

FIG. 3 discloses an assembly wherein the transmission includes two input shafts and one output shaft. Here again, corresponding components bear the same reference characters as in FIG. 1.

In this embodiment, pinions 21 carried by shafts 22 mesh directly with the toothed outer components 4a of the clutches 4. A drum type brake 23 similar to the brake 18—19—20 of FIG. 2 is associated with each of the shafts 11. A large brake is attached directly to the output shaft 8 and the brake includes a drum 24, the periphery of which is covered with friction material and the drum is surrounded by a metal annulus 25 which forms part of a water jacket 26. Means (not illustrated) are provided to contract the annulus to apply the braking effect and connections (not shown) supply a circulation of water through the water jacket 26.

There is shown diagrammatically in FIG. 4, a control arrangement for use with the assembly. A pump 30 draws liquid from a sump 31 suitably located, and supplies the liquid by way of relief valve 32 and a cooler 33 to the central bore 34 of a movable component 34a of a control valve 34b. The control valve is positioned on the gear casing and connected to a control in the wheel house by suitable means, and when the movable component is in the position denoted II, the pressure liquid passes through conduit 35 to the output shaft brakes, and through speed responsive valve means 36 and conduit 37 to the input shaft brakes.

When the movable component is moved to position I, pressure liquid is supplied through channel 38 to the ahead clutches and the liquid in conduits 35 and 37 returns to the sump 31 through conduit 39.

Lastly, when the movable component is moved to the position indicated III, the pressure liquid is supplied to the astern clutches.

Considering now FIG. 5, a vessel may be proceeding ahead at its normal speed and movement of the control lever in the wheel house so as to effecet a reversal, will initially arrest power from steam or gas high speed turbine and initiate disengagement of the ahead clutch 4 in reverse-reduction transmission. If left free, the turbine might continue in rotation with its stored energy for an undesired long period. If astern clutch 5 is engaged immediately, the energy dissipation of the turbine must occur in the clutch 5 within the transmission, with a destructive consequence.

Hence, it is necessary to bring the propeller and its shaft into solid driving relation with the turbine by means of the clutches 4 or 5 in the transmission, without the destructive effect of high energy dissipation within the clutches.

By virtue of the invention, there is effected simultaneous withdrawal of pressure from the clutches 4 or 5 and the application of pressure to brakes 10 and 13 thereby destroying or absorbing substantially, the kinetic energy from the turbine and the kinetic energy from the counter rotating propeller and shaft, augmented by the trailing effect from the movement of the vessel. The energy absorption involved in this maneuver in a vessel of 5000 tons, assumed to be performed in for instance 5 seconds would be 3 to 4 thousand horse power for such a period.

The problems with which the present invention is concerned and which are solved are:

(1) A ship with a high speed turbine must have a reduction gear to afford a reasonably efficient propeller speed;

(2) A high speed turbine may be unidirectional and thus requires a reversing gear;

(3) A solid drive from the turbine to the propeller in contrast to a hydraulic drive requires a convenient means of energy dissipation upon reversals; and (4) The action of the input and output brakes must be synchronized with the action of the ahead and the astern clutches.

The present invention is not to be confined to any strict conformity with the showings in the drawings and changes or modifications may be made therein so long as such changes or modifications mark no material departure from the spirit and scope of the appended claims.

I claim:

1. A power transmission including at least one prime mover, at least one output shaft, change direction reduction gearing means for operably connecting the prime mover to the output shaft, said change-direction reduction gearing means including gear means on the output shaft, forward and reverse drive pinions meshing with said gear means, pressure liquid operated clutch means capable of slip adapted for connection with each drive pinion and with the prime mover and operative to connect and disconnect the pinions with the prime mover, at least one pressure liquid operated brake means operably associated with the prime mover for imparting a braking effect on the prime mover, at least one further pressure liquid operated brake means operably associated with the output shaft for imparting a braking effect on the output shaft, a source of pressure liquid, control valve means, conduit means between said source and said control valve means, conduit means interconnecting the control valve means with said one brake means, said further brake means and said clutch means, respectively whereby actuation of the control valve means to operate the clutch means to change the direction of rotation of the output shaft, the drive to the output shaft is disconnected thereby operating said one brake and further brake means.

2. A power transmission assembly as claimed in claim 1, wherein said clutch means includes inner and outer components, an intermediate shaft means located on each side of the prime mover and the output shaft with one clutch means and a forward drive pinion being on each shaft means, the forward drive pinion being operably coupled to the inner component of the clutch means, further shaft means parallel to and spaced from each intermediate shaft means with one clutch means and a reverse drive pinion being on each further shaft means, the reverse drive pinion being operably coupled to the inner component of the clutch means, a drive connection between the outer components of the respective clutch means, said one brake means being carried by each intermediate shaft means, an input shaft extending from the prime mover, and further gear means connecting said one brake means to the input shaft.

3. A power transmission assembly as claimed in claim 2, wherein said one further brake means is carried by each forward drive pinion and gear means connecting said one further brake means to the output shaft.

4. A power transmission assembly as claimed in claim 1, wherein said clutch means includes inner and outer components, an intermediate shaft means located on each side of the prime mover and the output shaft with one clutch means and a forward drive pinion being on each shaft means, the forward drive pinion being operably coupled to the inner component of the clutch means, further shaft means parallel to and spaced from each intermediate shaft means with one clutch means and a reverse drive pinion being on each further shaft means, the reverse drive pinion being operably coupled to the inner component of the clutch means, a drive connection between the outer components of the respective clutch means, said one brake means being carried by each intermediate shaft means, the one further brake means being carried by the output shaft, and two input shafts geared to the clutch means on the intermediate shafts.

5. A power transmission assembly as claimed in claim 1, wherein said clutch means includes inner and outer components, an intermediate shaft means located on each side of the prime mover and the output shaft with one clutch means and a forward drive pinion being on each shaft means, the forward drive pinion being operably coupled to the inner component of the clutch means, further shaft means parallel to and spaced from each intermediate shaft means with one clutch means and a reverse drive pinion being on each further shaft means, the reverse drive pinion being operably coupled to the inner component of the clutch means, a drive connection between the outer components of the respective clutch means, an input shaft extending from the prime mover, two output shafts, said one brake means being carried by the input shaft, and the one further brake means being carried by each intermediate shaft.

6. A power transmission assembly as claimed in claim 1, wherein said clutch means, one brake means and further brake means are friction components with said clutch means being capable of slip and said brake means being capable of substantial dissipation of heat.

References Cited in the file of this patent
UNITED STATES PATENTS
2,469,743   Newton _____ May 10, 1949